United States Patent
Fritzsche

(10) Patent No.: US 10,377,173 B2
(45) Date of Patent: Aug. 13, 2019

(54) MOTOR VEHICLE WHEEL MODULE

(71) Applicant: Ford Global Technologies, LLC, Dearborn, MI (US)

(72) Inventor: Ralf Fritzsche, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/187,459

(22) Filed: Jun. 20, 2016

(65) Prior Publication Data
US 2016/0368317 A1    Dec. 22, 2016

(30) Foreign Application Priority Data
Jun. 22, 2015   (DE) .................. 10 2015 211 455

(51) Int. Cl.
*B60B 27/00*   (2006.01)
*B60B 27/06*   (2006.01)

(52) U.S. Cl.
CPC ...... *B60B 27/0031* (2013.01); *B60B 27/0078* (2013.01); *B60B 27/065* (2013.01); *B60B 27/0005* (2013.01)

(58) Field of Classification Search
CPC ............ B60B 27/0031; B60B 27/0078; B60B 27/065
See application file for complete search history.

(56) References Cited

U.S. PATENT DOCUMENTS

| 6,012,986 | A |  | 1/2000 | Guimbretiere |
| 8,210,752 | B2 | * | 7/2012 | Kamikawa ............ F16C 33/768 384/544 |
| 2009/0097792 | A1 | * | 4/2009 | Kamikawa ............ F16C 33/768 384/448 |
| 2010/0038958 | A1 | * | 2/2010 | Tsuzaki ............... B60B 27/0005 301/125 |
| 2011/0077089 | A1 | * | 3/2011 | Hirai .................. B60B 27/0005 464/139 |
| 2011/0170817 | A1 | * | 7/2011 | Niebling ............. B60B 27/0005 384/445 |

FOREIGN PATENT DOCUMENTS

DE    102007020877 A1    11/2008

* cited by examiner

*Primary Examiner* — Kip T Kotter
(74) *Attorney, Agent, or Firm* — Raymond L. Coppiellie; Burgess Law Office, PLLC

(57) ABSTRACT

A wheel module for a motor vehicle, the wheel module including a wheel carrier, a wheel hub, a wheel bearing separate from the wheel hub that supports the wheel hub on the wheel carrier, and a drive shaft for driving the wheel hub. The wheel hub having end face toothing engaging a mating toothing on the drive shaft. A spacer element is arranged axially between the wheel bearing and the drive shaft wherein the spacer element adjoins the end face toothing and/or the mating toothing radially on the outside.

9 Claims, 2 Drawing Sheets

MOTOR VEHICLE WHEEL MODULE

CROSS-REFERENCE TO RELATED APPLICATIONS

Not Applicable.

BACKGROUND OF THE INVENTION

1. Field of the Invention

The present invention relates to a motor vehicle wheel module, and more specifically, to a wheel module including a wheel hub and wheel bearing.

2. Description of Related Art

Motor vehicles typically include driven wheels mounted on a wheel carrier. The wheel carrier normally connected to the vehicle body by a plurality of links, for example longitudinal and transverse links. More precisely, a wheel hub normally mounted on the wheel carrier using rolling bearings. A brake disk and the wheel rim may also be mounted on the wheel hub. A drive shaft, coupled to the engine through a transmission drives the wheel.

Torque transmission from the drive shaft to the wheel hub is normally done through serrations; i.e., the wheel hub has an axial bore, around the inside of which serrations, in other words a toothed ring of axially extending teeth, are formed. On the outside, the drive shaft has a corresponding encircling toothed ring. The drive shaft is arranged in the bore such that the two toothed rings engage one another. A thread is normally formed on the drive shaft at an end arranged toward the outside of the vehicle. A nut threadably engages the threaded end of the drive shaft, clamps the wheel clamped axially against the drive shaft. The wheel hub instead of supported directly on the drive shaft, the wheel hub may be supported through one or two inner races of the rolling bearing. The inner race or races of the rolling bearing is/are clamped between the wheel hub and the drive shaft, which may include a flange portion for this purpose.

The wheel bearing can be a "first-generation" (GEN1) wheel bearing, for example, one wherein two rows of rolling bearings are generally arranged between two inner races and one outer race. Here the structure of the races is roughly that of a cylindrical shell, wherein the side facing the rolling elements is, in each case, designed to accommodate the elements. The wheel bearing forms a combined subassembly, which is put in into the wheel carrier and mounted on the wheel hub. With "second-generation" (GEN2) wheel bearings, the wheel hub is, to a certain extent, of integral design with an inner race; i.e., the inner race has a flange on which the brake disk and the rim are mounted. With "third-generation" (GEN3) wheel bearings, the outer race additionally has a flange, the flange secured on the wheel carrier by means of screwed joints.

SUMMARY OF THE INVENTION

A wheel module, the wheel module including a wheel hub, a wheel bearing separate from the wheel hub, and a drive shaft, the wheel hub having an end face toothing engaging a mating toothing on the drive shaft. A spacer element arranged axially between the wheel bearing and the drive shaft such that the spacer element spans a junction of the end face toothing and the mating toothing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

In the different figures, identical parts are always provided with the same reference signs, for which reason these are also generally described only once.

Figure 1:
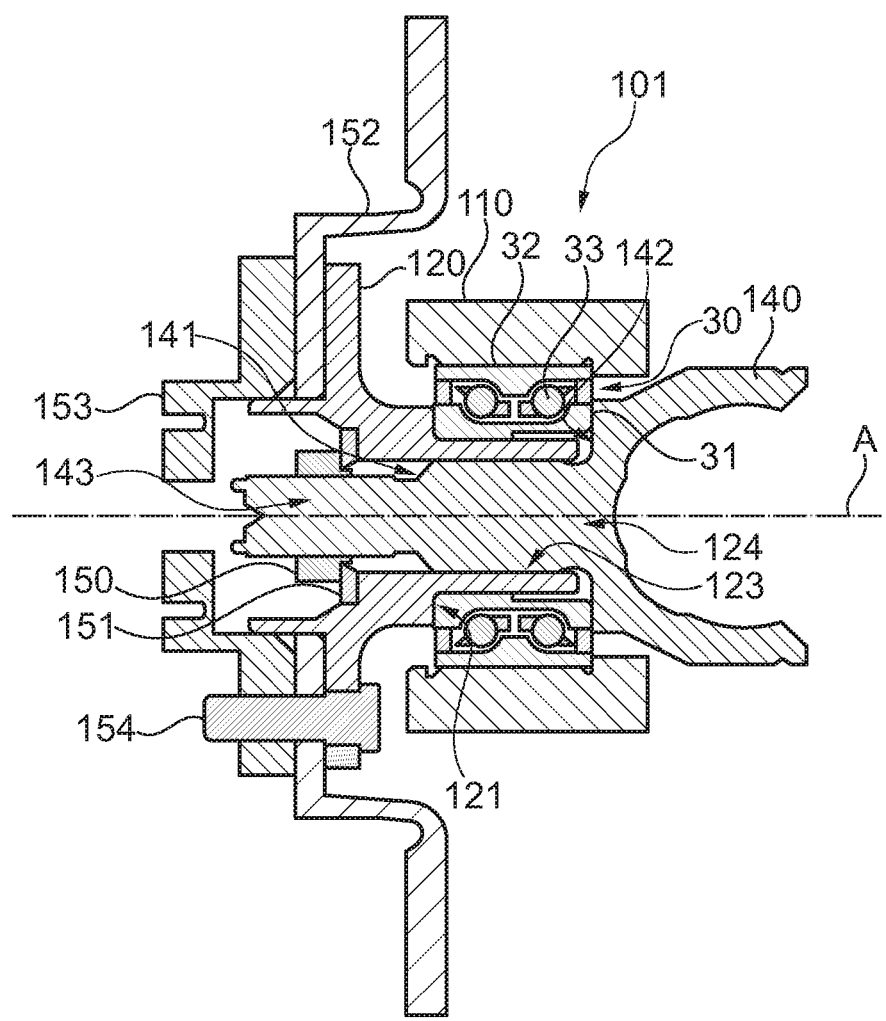
FIG. 1 shows a section through a wheel module according to the prior art.

FIG. 1 illustrates a section through a wheel module 101 in accordance with the prior art. The entire module 101 is of rotationally symmetrical design with respect to an axis A of rotation. The module 101 includes a wheel hub 120 rotatably mounted on a wheel carrier 110 with a first-generation wheel bearing 30. The wheel bearing 30 includes two inner races 31 and an outer race 32, two rows of rolling elements 33, illustrated herein as spherical elements or balls, arranged between the inner races 31 and the outer race 32 and laterally arranged seals. Links, springs, and shock dampers (not shown) connect the wheel carrier 110 to a vehicle body.

The wheel bearing 30 is pushed onto the wheel hub 120 in an axial direction, (the direction of the axis A of symmetry and rotation) and rests against a shoulder 121 thereof. On the opposite side, the wheel bearing 30 rests against a shoulder 142 of a side or drive shaft 140, which is connected to the drive of the vehicle by components which are not shown. To introduce power into the wheel hub 120, the side or drive shaft 140 passes through a central bore 124 in the wheel hub 120, wherein internal serrations 123 on the wheel hub are in engagement with corresponding external mating toothing 141 on the side or drive shaft 140. During the operation of the vehicle, the side or drive shaft 140 must transmit considerable torques, which are associated with tangential forces, whereby the portion 143 arranged in the wheel hub must be of relatively massive design. At the end, an external thread is formed on the side or drive shaft 140 and, seated on the thread, is a nut 150, which clamps the wheel hub 120 against the side or drive shaft 140, together with the wheel bearing 130 situated therebetween, with a washer 151. A brake disk 152 and a rim 153 of a wheel (here shown only in part) are mounted on the outside of the wheel hub 120 in a known manner with screws 154.

Figure 2:
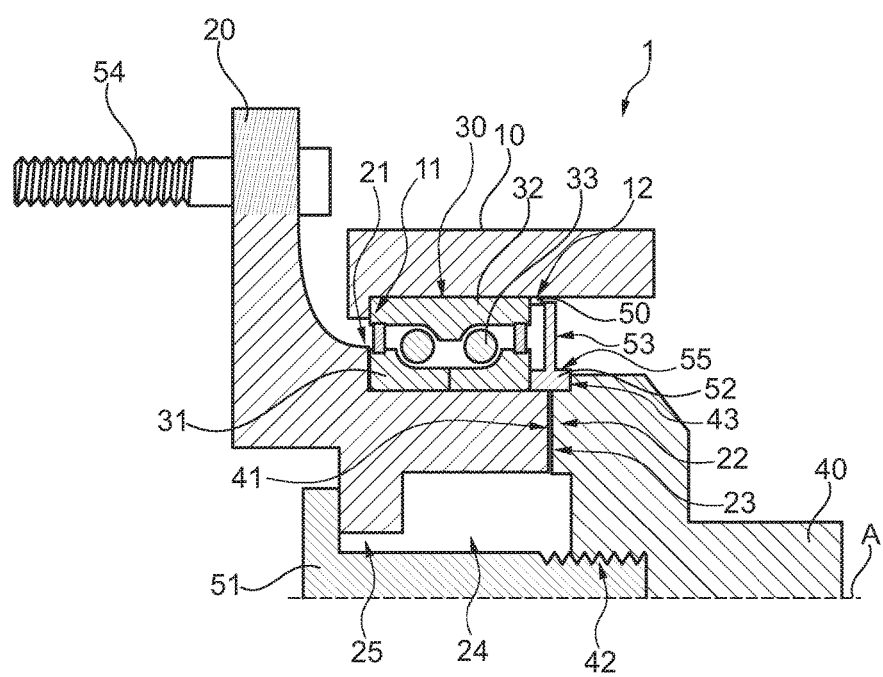
FIG. 2 shows a section through a wheel module according to an example of the present invention.

FIG. 2 illustrates a section through a wheel module 1 according to the invention, wherein only one-half of the wheel module 1 is shown. The wheel module 11 has symmetry with respect to the axis A of rotation. The wheel module 1 includes a wheel hub 20 rotatably mounted relative to a wheel carrier 10 with a first-generation wheel bearing 30, which is the same as that illustrated in FIG. 1. Screws 54 secure a brake disk and a rim on the wheel hub 20. On the side facing the wheel carrier 10, the wheel bearing 30 is pushed in an axial direction, wherein a shoulder 11 of the wheel carrier 10 forms a stop. On the opposite side, a retaining ring 50, inserted into a groove 12 provided for this purpose in the wheel carrier 10, axially secures the wheel bearing. On the side facing the wheel hub 20, the wheel bearing 30 rests against a radially extending shoulder 21 provided for this purpose.

For power transmission, a side or drive shaft 40 engages the wheel hub 20, although, in contrast to the wheel module 101 shown in FIG. 1, no serrations 123 with axially extending teeth are provided. Instead, an end 22 of the wheel hub 20 facing the side or drive shaft 40 includes end face toothing 23. The end face toothing 23 surrounding a central bore 24 on the wheel hub 20 in a circular ring. The end face toothing 23 has a plurality of radially extending teeth, not shown in detail here. The side or drive shaft 40 has complementary mating toothing 41. The two sets of toothing 23, 41 held in engagement by a screw 51, the head of which is supported against a radially inward-directed flange portion 25 of the wheel hub 20. The screw 51 passes through the central bore 24 and engages complementary internal thread 42 provided for this purpose on the side or drive shaft 40. It is contemplated that the screw 51 absorbs primarily axial forces and can be made thinner and with less material than that portion 143 (present in FIG. 1) of the side or drive shaft 140 which bears the mating toothing 123.

As shown, the wheel bearing 30 does not rest directly against the side or drive shaft 40. Instead, a spacer element 52 is arranged between the wheel bearing 30 and side or drive shaft 40. The spacer element 52 is positioned adjacent to and radially outside of the end face toothing 23 and the mating toothing 41. For example, the spacer element 52 is configured as an inverted T, with a sealing portion 53 extending in a radial direction and a contact flange 55 arranged perpendicularly thereto. As shown in FIG. 2, the contact flange 55 of the spacer element 52 has parallel end faces extending perpendicular to the axis of rotation A. One of the parallel end faces of the contact flange 55 rests against the relevant inner race 31 of the wheel bearing 30 and the other of the parallel end faces rests against the side of the drive shaft 40; i.e., against a recess 43 in the side of the drive shaft 40. In this configuration, the spacer element 52 secures the position of the inner races 31 of the wheel bearing 30 on the wheel hub 20. Moreover, the spacer element 52 extends about or runs tangentially around the end face toothing 23 and the mating toothing 41. Thereby surrounding the end face toothing 23 and the mating toothing 41 and largely preventing penetration of dirt and moisture into the region of the sets of toothing 23, 41. In one example, the sealing portion 53 of the spacer element 52 forming a circular ring extending in a radial direction to just in front of the wheel carrier 10. Even if the seal between the sealing portion 53 and the wheel carrier 10 is not airtight or liquid-tight, a labyrinth seal is nevertheless produced thereby, decreasing penetration of dirt and moisture into the region of the wheel bearing 30.

Overall, the wheel module 1 can be assembled simply and has a reduced weight. In addition, the regions of the sets of toothing 23, 41 and of the wheel bearing 30 are to a large extent protected from dirt and moisture by the spacer element 52.

The disclosed example set forth a wheel module 1 for a driven axle of a motor vehicle. Here, the vehicles concerned are passenger vehicles or trucks. The wheel module 1 has a wheel carrier 10, a wheel hub 20, and a wheel bearing 30 separate from the wheel hub which supports the wheel hub 20 on the wheel carrier 10. A drive shaft drives the wheel hub 20. The wheel carrier 10 is the component used for mounting the vehicle wheel on the vehicle. The wheel carrier 10 can be connected to the vehicle body (bodywork and/or chassis) through various links, springs, and/or shock dampers. As is likewise known, the wheel hub 20 supports the actual wheel, on which a brake disk and a rim of the wheel can be mounted, typically by means of screwed joints.

As illustrated in FIG. 2, the wheel bearing 30 is separate from the wheel hub 20, which is not integrated into the wheel bearing 30, as would be the case with wheel bearings of the second or third generation. In particular, the wheel bearing 30 can be designed as a rolling bearing with two rows of rolling elements. In this arrangement, the rolling elements can be arranged between an outer race and at least one inner race, typically two inner races. As known in the prior art, seal elements are normally situated between the outer and the inner race toward the outside, preventing lubricant from escaping and foreign bodies from penetrating into the bearing. It is self-evident that the wheel hub 20 is supported on the wheel carrier 10 whereby it engages a corresponding bore in the wheel carrier 10 such that the outer race of the wheel bearing 30 is associated with the wheel carrier 10 and at least one inner race is associated with the wheel hub 20. A wheel bearing of this kind is generally preloaded during assembly of the wheel module, in contrast to a wheel bearing with a combined wheel hub, which is mounted as a preloaded unit.

The separate configuration of the wheel hub 20 and the wheel bearing 30 provides various advantages. For example, the raceways for the rolling elements must be hardened and made from relatively high-grade steel. With an integrated design, the entire wheel hub/rolling bearing unit must be made from this high-grade steel. In contrast, the wheel hub 20 of the present example may comprise lower-cost steel whereby hardenable rolling bearing steel is required only for the rolling bearing itself. Moreover, the rolling bearing can be replaced if it fails due to wear, and the wheel hub can continue to be used, leading to lower costs for spare parts.

In addition, the drive shaft 40 can be the outermost part of a Cardan shaft or a joint bell or the like. It is always connected at least indirectly to the transmission and the engine of the vehicle, because to drive the wheel, a connection between the drive shaft 40 and the wheel hub 20 is necessary.

In the present example, the wheel hub 20 has an end face toothing 23, which engages a complementary mating toothing 41 on the drive shaft 40 establishing connection between the two components. End face toothing 23 of this kind includes a plurality of teeth, which are arranged on one end of the wheel hub 20. The teeth are arranged in succession in the tangential direction. The teeth preferably are located in a plane perpendicular to the axis of rotation A of the wheel hub 20. If an axial direction is identified with this axis of rotation, it is possible, in particular, for the teeth to extend in a radial direction, even if they can, in principle, also slope relative to the radial direction or can even be curved. Of course, the mating toothing 41 on the drive shaft engages with the end face toothing 23 and includes teeth, the shape and spacing of which are complementary or matched to the teeth of the end face toothing 23.

Compared with serrations, such end face toothing 23 has decisive advantages. The drive shaft 40 no longer must pass through a bore in the wheel hub 20 and bear a thread at one end, on which a nut is fastened. This means that the corresponding part of the drive shaft, which is arranged in the wheel hub in the prior art, can be left out. It should be noted that the part must transfer considerable torque between the drive shaft and the wheel hub and therefore needs to be of comparatively massive configuration. Moreover, the inside diameter of the wheel hub 20 is no longer dependent on the design of a set of serrations and can be made smaller, if appropriate. In the solution according to the invention, material and weight are saved. The mounting of the wheel hub 20 on the drive shaft is a simple matter. In particular, the "drawing in" of the drive shaft is eliminated, as compared with a solution involving serrations, wherein self-centering of the wheel hub can be achieved in many cases.

As shown in FIG. 2, at least one spacer element 52 is arranged axially between the wheel bearing 30 and the drive shaft 40. With this spacer element, the position of the wheel bearing can be set exactly, independently of the precise configuration of the drive shaft 40. Here the drive shaft can exert an axial force on the wheel bearing through the at least one spacer element 52. Here, the spacer element 52 or elements can be of ring-type design in accordance with the ring shape of the wheel bearing; i.e., it can be designed extend around tangentially. Using a spacer element 52 can be combined with a configuration where the wheel bearing 30 is mounted on the wheel hub 20 and rests against a shoulder 21 of the wheel hub 20.

As set forth above, the at least one spacer element 52 adjoins the end face toothing 23 and/or the mating toothing 41 radially on the outside. In this arrangement, the drive shaft 40 can have a shoulder which extends radially beyond the mating toothing 41 and against which the spacer element 52 rests. The spacer element 52 can at least partially protect the region in which the two sets of toothing 23, 41 are arranged from outside contamination. In the disclosed example, the spacer element 52 covers both the end face toothing 23 and the mating toothing 41 radially with respect to the outside. In this arrangement, at least partial protection of the sets of toothing 23, 41 from moisture is advantageously achieved, reducing susceptibility to corrosion and improving the service life.

The end face toothing 23 is preferably arranged around a central bore 24 in the wheel hub 20. In this arrangement, the central bore 24 extends in an axial direction; i.e., parallel to the axis of rotation A of the wheel hub 20. Typically, the central bore 24 is symmetrical with respect to the axis of rotation A. In this example, the end face toothing 23 is therefore in a ring or a circular ring. The same applies to the mating toothing 41 engaging the end face toothing 23.

As shown, the wheel bearing 30 is mounted on the wheel hub 20 in an axial direction and rests against a radially outward-extending shoulder 21 on the wheel hub 20. The shoulder 21 is normally formed in an encircling manner in a tangential direction. It can, for example, be part of a flange on the wheel hub 20. The shoulder 21 limits the freedom of motion of the wheel bearing 30 in the axial direction. During assembly, the wheel bearing 30 is mounted or pushed onto the wheel hub 20 in an axial direction, wherein the shoulder 21 forms a stop. Alternatively, the wheel hub 20 is inserted, in particular pressed, into the wheel bearing 30. It is self-evident that an outside diameter of the wheel hub 20 on the side of the shoulder 21 from which mounting is to occur must not be any larger in this arrangement than an inside diameter of the wheel bearing 30. On the opposite side from the shoulder, the position of the wheel bearing can be determined in various ways. For example, a retaining ring can be used with the ring engaging in a corresponding groove in the wheel hub.

Although the outer race 32 of the wheel bearing 30 may have a flange securing the wheel bearing 30 the wheel carrier 10, in the present example, the wheel bearing 30 is inserted into the wheel carrier 10 in an axial direction and is secured between a radially inward-extending shoulder 11 on the wheel carrier 10 and a retaining ring 50 inserted into the wheel carrier 10. It is also possible to provide a radially encircling shoulder, which extends inward, in the manner of a flange. The retaining ring 50 also referred to as a circlip or a snap ring engages a tangentially encircling groove in the wheel carrier 10 and limits or prevents axial movement of the wheel bearing 30.

Compared to a solution where the wheel bearing 30 has a flange screwed to the wheel carrier 10, the weight of the flange and that of the screws can be eliminated in the described example. In the disclosed example, the wheel bearing is mounted on the wheel hub. During assembly, the wheel bearing can be pressed into the wheel carrier and secured first, after which the wheel hub is pressed into the wheel bearing.

In addition, the spacer element 52 may include a sealing portion 53 extending radially outward into the region of the wheel carrier 10. The sealing portion can be, for example, in a circular ring. As shown, the sealing portion 53 is arranged on a side of the wheel bearing 30 facing the drive shaft. In general, it does not end at the wheel carrier 10 but, instead, there remains a certain space between them. However, the sealing portion 53 forms a labyrinth seal that greatly reduces penetration of dirt into the region of the wheel bearing 30. Although the wheel bearing normally has seals to protect the interior, the labyrinth seal decisively improves protection from moisture and dirt. It has been found that the part of the wheel bearing 30 facing the drive shaft is at greater risk from dirt and moisture. It is precisely the wheel bearing 30 that the sealing portion 53 protects. While it is advantageous if the wheel module includes one spacer element, having at least one sealing portion protection can be increased by providing a plurality of sealing portions following one another in the axial direction.

As shown, the wheel hub 20 is clamped against the drive shaft 40 with a screw 51 passing through the central bore 24. During assembly, the screw 51 extends through the central bore 24 from the direction of the wheel hub; i.e., the outside of the wheel module, and secured on the drive shaft 40. For clamping, a head of the screw can rest directly against a flange or the like on the wheel hub 20, or an interposed element, like a washer, can be provided. As the wheel hub 20 is clamped against the drive shaft 40, the wheel bearing 30 is normally also preloaded. On the drive shaft side, the screw can be secured with a nut, for example. However, in the disclosed example the screw 51 engages in an internal thread 42 on the drive shaft 40. It should be noted that such a screw, which absorbs essentially only axial forces, could be made significantly thinner and with less material than the drive shaft of prior-art systems, which engages the serrations in a central bore in the wheel hub. It is possible to achieve a considerable weight saving over a system of this kind.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A wheel module comprising:
   a wheel hub;
   a wheel bearing separate from the wheel hub;
   a drive shaft wherein said wheel hub has an end face toothing engaging a mating toothing on said drive shaft;
   a cylindrical spacer element having parallel end faces extending perpendicular to an axis of rotation, said spacer element arranged axially between said wheel bearing and said drive shaft wherein one of said end faces engages an inner race of the wheel bearing and the other end face engages a recess in the drive shaft such that said spacer element spans a junction of said end face toothing and said mating toothing;

said spacer element having a sealing portion extending radially outward to a position adjacent to but not contacting a wheel carrier; and a screw engaging said wheel hub and having a threaded portion engaging said drive shaft, said screw operative to clamp said spacer element between said inner race and said drive shaft wherein said spacer element establishes a fixed distance between said end face toothing on said wheel hub and said mating toothing on said drive shaft and to preload said wheel bearing wherein a preload force is transmitted through said spacer element.

2. The wheel module of claim 1 wherein said end face toothing is arranged around a central bore in said wheel hub.

3. The wheel module of claim 1 wherein said wheel bearing is mounted on said wheel hub in an axial direction and rests against a radially outward-extending shoulder on said wheel hub.

4. The wheel module of claim 1 wherein said wheel bearing is inserted into said wheel carrier in an axial direction and is secured between a radially inward-extending shoulder on said wheel carrier and a retaining ring inserted into said wheel carrier.

5. The wheel module of claim 1 wherein said spacer element adjoins the end face toothing or mating toothing radially on the outside.

6. A wheel module comprising:
a wheel carrier;
a wheel hub having an end face toothing;
a drive shaft having a complementary end face toothing engaging said end face toothing of said wheel hub;
a wheel bearing having two rows of rolling bearings arranged between an outer race and first and second axially aligned adjacent inner races;
said outer race contacting said wheel carrier;
said first and second inner races contacting said wheel hub;
a spacer element having a contact portion and a sealing portion, said contact portion extending between and contacting said second inner race and said drive shaft;
a screw engaging said wheel hub and having a threaded portion engaging said drive shaft, said screw operative to clamp said spacer element between said second inner race and said drive shaft to preload said wheel bearing wherein said preload force is transmitted through said spacer; and
wherein said sealing portion extends radially outward from said contact portion and is spaced from both said wheel carrier and said wheel bearing in a non-contacting relationship.

7. The wheel module of claim 6 wherein said sealing portion has a radially outward end positioned adjacent but spaced from said wheel carrier.

8. The wheel module of claim 7 wherein said sealing portion forms a labyrinth, noncontacting seal adjacent and between said sealing portion and said wheel carrier.

9. The wheel module of claim 6 including said spacer element operative to establish a fixed distance between said end face toothing on said wheel hub and said complementary toothing on said drive shaft.

\* \* \* \* \*